(12) United States Patent
Dean et al.

(10) Patent No.: US 12,077,369 B2
(45) Date of Patent: Sep. 3, 2024

(54) SANITIZATION STORAGE APPARATUS

(71) Applicant: Dean Transportation, Inc., Lansing, MI (US)

(72) Inventors: Christopher Dean, Okemos, MI (US); Daren Baker, Lansing, MI (US); James Prang, Williamston, MI (US); Scott Somerville, Mason, MI (US); Steven McGeorge, Lansing, MI (US)

(73) Assignee: Dean Transportation, Inc., Lansing, MI (US)

( * ) Notice: Subject to any disclaimer, the term of this patent is extended or adjusted under 35 U.S.C. 154(b) by 353 days.

(21) Appl. No.: 17/475,564

(22) Filed: Sep. 15, 2021

(65) Prior Publication Data

US 2022/0081199 A1    Mar. 17, 2022

Related U.S. Application Data

(60) Provisional application No. 63/079,647, filed on Sep. 17, 2020.

(51) Int. Cl.
| | |
|---|---|
| *B65D 85/00* | (2006.01) |
| *B65D 71/02* | (2006.01) |
| *F16M 13/02* | (2006.01) |

(52) U.S. Cl.
CPC .......... *B65D 85/70* (2013.01); *B65D 71/02* (2013.01); *F16M 13/02* (2013.01)

(58) Field of Classification Search
CPC .......... B65D 3/24; B65D 7/065; B65D 11/02; B65D 25/04; B65D 81/3216; B65D 59/00; B65D 59/02; B65D 59/04; B65D 59/06

USPC .... 206/216, 443, 782, 775, 499, 315.1, 407, 206/481, 478, 446, 406, 565, 734, 764; 220/23.88, 23.87, 23.86, 503, 505, 554, 220/676, 737, 23.83; 211/74; 312/235.2, 312/117

See application file for complete search history.

(56) References Cited

U.S. PATENT DOCUMENTS

| | | | |
|---|---|---|---|
| 3,811,565 A * | 5/1974 | Tancredi | B65D 25/102 |
| | | | 40/658 |
| 4,163,517 A * | 8/1979 | Kappler | B65D 15/08 |
| | | | 220/916 |
| 4,865,097 A * | 9/1989 | Allen | B65D 65/02 |
| | | | 446/268 |
| 10,647,500 B1 * | 5/2020 | Madden | A01K 27/008 |

(Continued)

*Primary Examiner* — Robert Poon
(74) *Attorney, Agent, or Firm* — Varnum LLP (57) ABSTRACT

A sanitation storage device and a method of installing the same is provided. The device comprises an upper storage portion comprising a platform, an upper storage portion containment feature, and an upper storage portion access opening. The device further comprises a lower storage comprising a lower storage portion access opening and a lower storage portion containment feature. The upper storage portion is configured to receive a first container filled with a hand sanitizer, such that the first container is disposed upon the platform and extends through the upper opening, and the lower storage portion is configured to receive a second container, filled with a cleaning solution, such that the second container is disposed within the interior void. The storage device allows for storage of hand sanitizer and cleaning solution in a manner that conceals the cleaning solution while allowing easy access to the hand sanitizer in the respective communal space.

20 Claims, 8 Drawing Sheets

(56) References Cited

U.S. PATENT DOCUMENTS

| | | | |
|---|---|---|---|
| 2008/0314912 A1* | 12/2008 | Horsburgh | B65D 59/02 |
| | | | 220/605 |
| 2011/0168581 A1* | 7/2011 | Williams | A47K 10/22 |
| | | | 206/216 |
| 2011/0174423 A1* | 7/2011 | Touchet | B29C 66/542 |
| | | | 425/112 |
| 2015/0114969 A1* | 4/2015 | Martin | B65D 25/56 |
| | | | 220/676 |

* cited by examiner

SANITIZATION STORAGE APPARATUS

CROSS REFERENCE TO RELATED APPLICATIONS

This application claims the benefit of U.S. Provisional Application No. 63/079,547 filed Sep. 17, 2020, which is hereby incorporated by reference in its entirety.

TECHNICAL FIELD

The present specification generally relates to storage devices and, more specifically, to a storage device for holding and safely securing sanitizing supplies for easy and convenient use in communal environments.

BACKGROUND

To prevent the spread of germs, hand sanitizer, and sanitizing cleaners are frequently used. Using hand sanitizer and sanitizing cleaners is known to reduce microbial counts and kills many harmful germs that could infect people with the bacterial and viral infections. Hand sanitizer is helpful in preventing the spread of germs. One effective way to remind people to use hand sanitizer is by making it easily accessible and always within sight. Accordingly, it is beneficial to provide hand sanitizing products in high traffic areas and communal spaces. Further, it is beneficial to provide cleaning supplies to sufficiently clean and sanitize a shared or communal space.

SUMMARY

A sanitation storage device and a method of installing the same is provided. The storage device comprises an elongated hollow body extending from a first end to a second end and having a first side and a second side. The body thereby defines an interior void extending between the first end and the second end, with the second end defining an upper body or top opening.

The body further comprises an upper storage portion and a lower storage portion. The upper storage portion comprises a platform, an upper storage portion containment feature, and an upper storage portion access opening. The lower storage portion comprises a lower storage portion containment feature and a lower storage portion access opening.

The upper storage portion is configured to receive a first container, filled with a first sanitation product such as a hand sanitizer, such that the first container is disposed upon the platform and extends through the upper body or top opening. The lower storage portion is configured to receive a second container, filled with a second sanitation product, such as a cleaning solution, such that the second container is disposed within the interior void at the first end and extends above the lower storage portion containment feature and into the lower storage access opening.

The first container may be secured within the upper storage portion with a first securing strap and the second container may be secured within the lower storage portion with a second securing strap.

The storage device may be mounted to a fixed substrate such as a floor, wall, or the like with a mounting component.

The method of installation disclosed herein includes a method of installing the sanitation storage device on a mass transit vehicle, such as an airplane, a school bus or the like. The method of installation includes the steps of: providing a sanitation storage device of the present disclosure; securing a mounting component base to a fixed substrate, i.e., the floor of a school bus, applying an adhesive to a sidewall of the base; positioning the body about the side wall of the base, such that the sidewall extends upward from the first end of the body and into the interior void, and positioning the body such that the first side faces a driver's seat of the mass transit vehicle and the second side faces an entrance of the mass transit vehicle; positioning a first container, filled with hand sanitizer, in the upper storage portion; and positioning a second container, filled with cleaning solution, in the lower storage portion.

The storage device and the method of installation disclosed herein allows for storage of two essential disease mitigation materials, e.g., hand sanitizer and cleaning solution in a manner that conceals the cleaning solution, as required by various laws and regulations particularly in communal spaces that house groups of children, while allowing easy access to the hand sanitizer in the respective communal space.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. The terms proximal and distal may be understood to provide generally opposing terms to describe relative spatial positions.

The following discussion and accompanying figures disclose embodiments of the sanitation storage apparatus 100 of the present invention. Using hand sanitizer and sanitizing cleaners is known to reduce microbial counts and kills many harmful germs that could infect people with the bacterial and viral infections. Hand sanitizer is helpful in preventing the spread of germs. One effective way to remind people to use hand sanitizer is by making it easily accessible and readily within sight. Accordingly, it is important to provide hand sanitizing products in high traffic areas and communal spaces. In a general sense, the present disclosure provides a sanitation storage apparatus 100 for holding and safely securing both hand sanitizer 122 and cleaning supplies 120 for easy and convenient use in communal environments such as office environments, concert and athletic event venues, schools, and mass transit vehicles, such as airplanes or school buses 200. The present method 300, comprises a method of installation for the sanitation storage apparatus 100 in a mass transit vehicle, such as a school bus 200.

The sanitation storage device 100, or sanitation station, is particularly advantageous in that it allows for storage of two essential disease mitigation materials, e.g., hand sanitizer and cleaning solution. The storage device 100 and the method of installation 300 disclosed herein allows for storage of two essential disease mitigation materials, e.g., hand sanitizer and cleaning solution in a manner that conceals the cleaning solution, as required by various laws and regulations particularly in communal spaces that house groups of children, while allowing easy access to the hand sanitizer in the respective communal space. More particularly, the cleaning solution may be obstructed from the passenger's view as he or she enters or boards a mass transit vehicle 200, whereas the hand sanitizer is positioned in the passenger's direct visual line of sight when boarding the mass transit vehicle 200 to encourage each passenger to utilize such hand sanitizer upon boarding the mass transit vehicle 200.

As shown in FIGS. 1-6B, the sanitation storage apparatus 100 may comprise a body 102. The body 102 may be formed of a polymer material. The polymer material may be a thermoplastic polymer material, for example, a Polyvinyl Chloride (PVC), an Acrylonitrile Butadiene Styrene (ABS) material, or the like having sufficient strength and resiliency to be safely and fixedly secured to a mounting substrate 10 (FIGS. 5A and 5B). In one example embodiment, the thermoplastic polymer material may be opaque in coloration, and, as such, the opaque coloration of the body 102 shields the respective containers 120 and 122 and the contents thereof, e.g., hand sanitizer and cleaning solution from sunlight and other light sources. Shielding the contents of the respective containers 120 and 122, e.g., hand sanitizer and cleaning solution from sunlight and other light sources may improve or extend the useful life of such contents.

The body 102 may be formed by first obtaining a hollow tubular blank of one of a Polyvinyl Chloride (PVC), an Acrylonitrile Butadiene Styrene (ABS) material, or similar material and cutting the same to a desired height D1. The tubular blank may then be customized as detailed herein below via programming a Computer Numerical Control (CNC) cutting machine to customize the tubular blank, inserting the tubular blank into the CNC machine, and defining cutouts or other features in the body 102, such as each of a lower portion access opening 119, an upper storage portion access opening 117, a plurality of upper storage portion apertures 112, and a plurality of lower storage portion apertures 114 in the first side of the tubular blank with the CNC machine.

The body 102 may further define a first side 134 and a second side 136. The body of the sanitation storage apparatus 102 may further extend from a first end 130 to a second end 132. In this way the distance from the first end 130 to the second end 132 may comprise an overall height D1 of the body. In one example embodiment, suitable to installation in mass transit vehicles such as school buses 200, the distance D1 may be from about 20 inches to about 24 inches. In one preferred embodiment, the distance D1 may be about 22 inches. In another example embodiment, suitable for use in office environments, classrooms, and/or sporting and concert venues, the distance D1 may be from about 17 inches to about 19 inches. In one preferred embodiment, the distance D1 may be about 18.5 inches.

Figure 4:
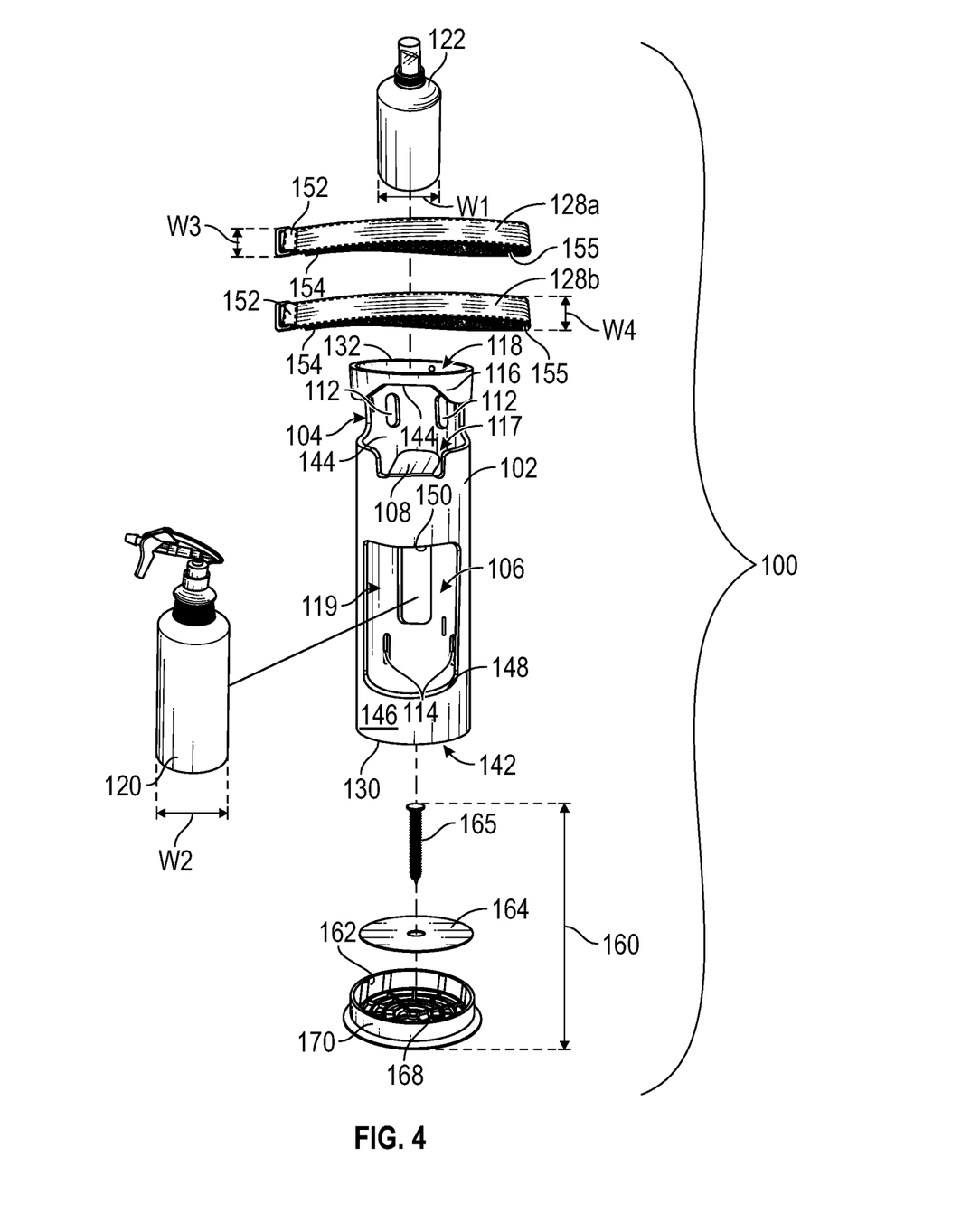
FIG. 4 depicts an exploded perspective view of the sanitization storage apparatus according to one or more embodiments shown and described herein.
Figure 5A:
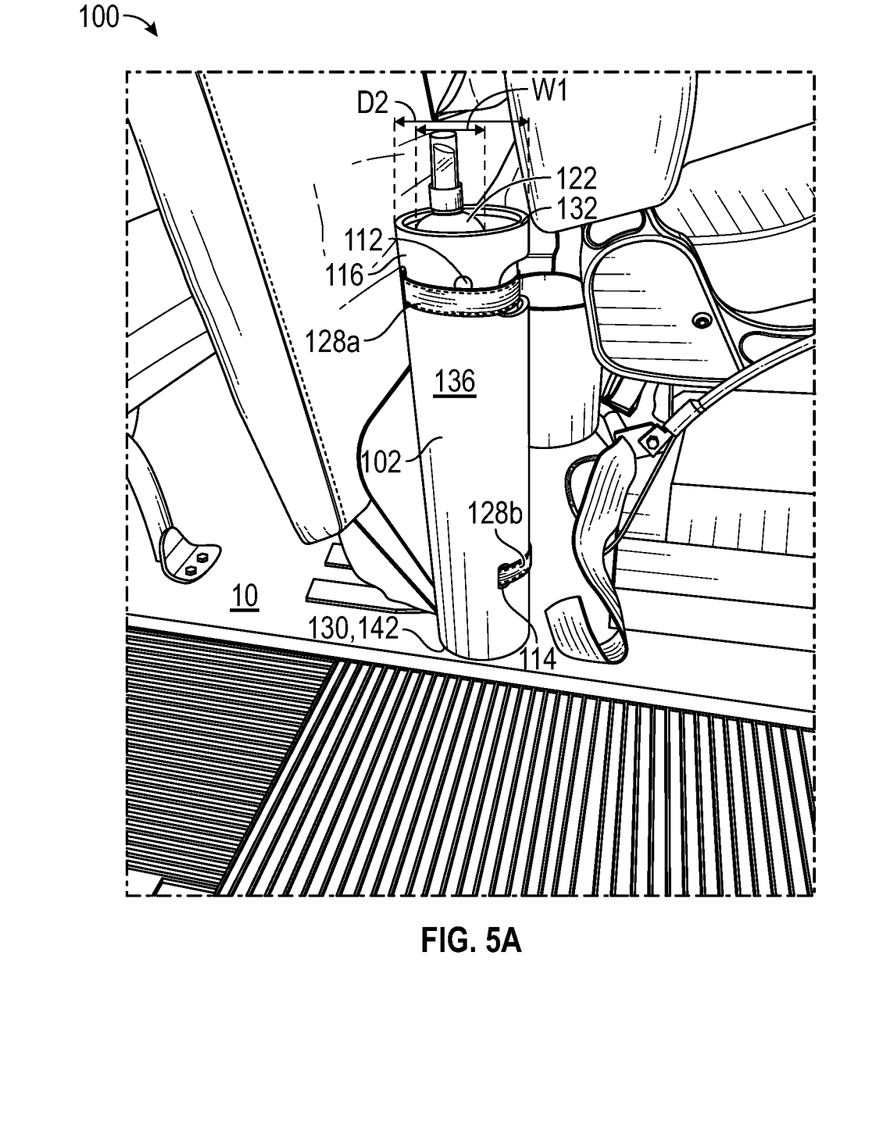
FIG. 5A depicts a schematic rear perspective view of the sanitization storage apparatus installed in a mass transit vehicle.
Figure 5B:
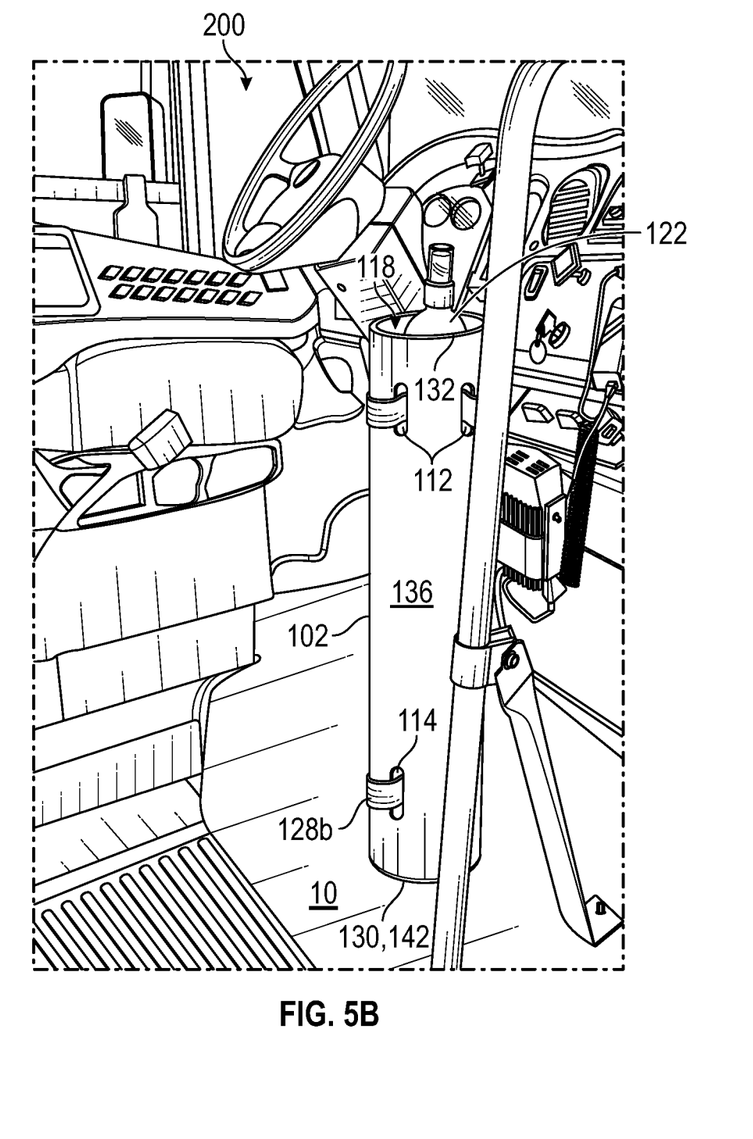
FIG. 5B depicts another schematic rear perspective view of the sanitization storage apparatus installed in a mass transit vehicle.
Figure 6A:
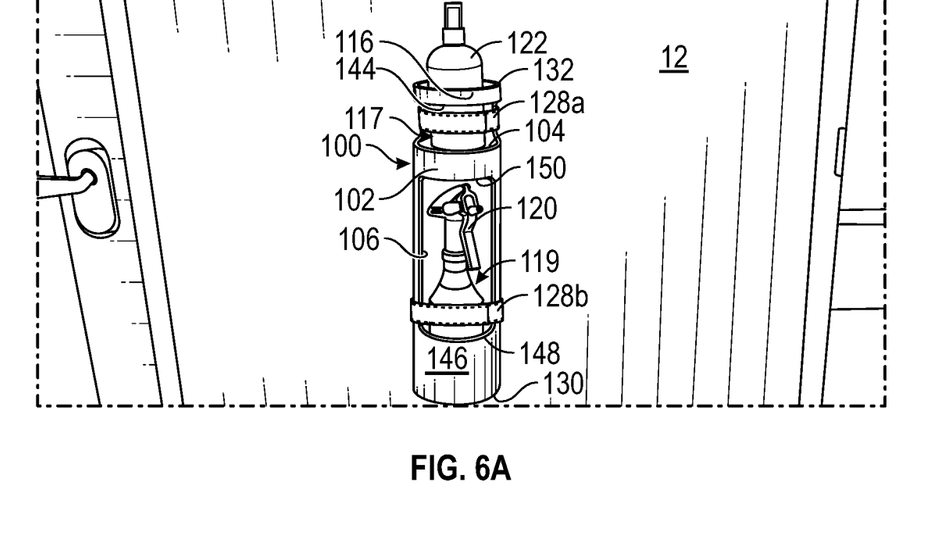
FIG. 6A depicts a schematic front perspective view of an alternative embodiment of the sanitization storage apparatus installed within an office environment according to one or more embodiments shown and described herein.
Figure 6B:
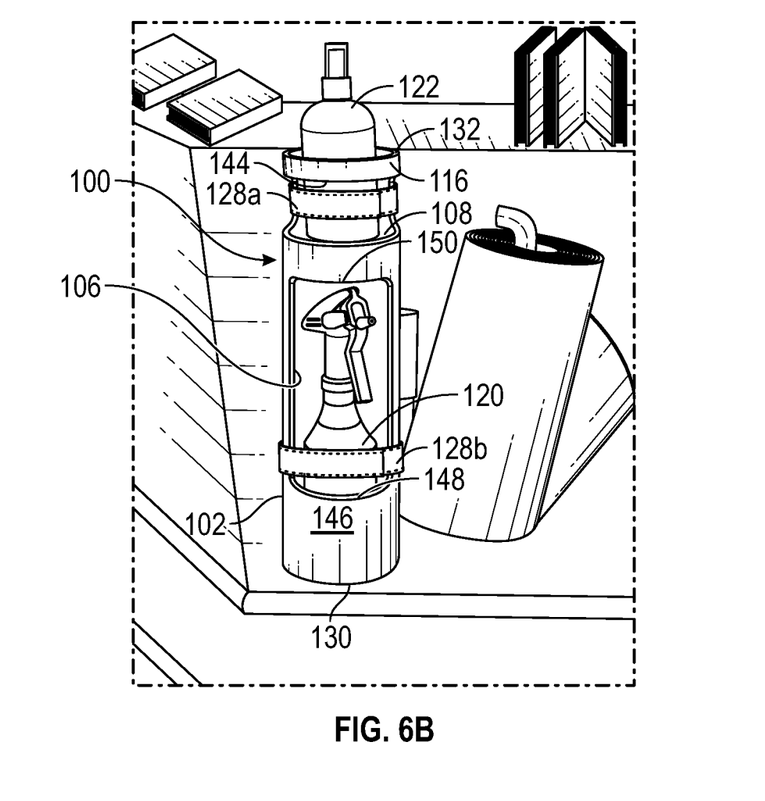
FIG. 6B depicts another schematic front perspective view of an alternative embodiment of the sanitization storage apparatus installed within an office environment according to one or more embodiments shown and described herein.

The body 102 may define an interior void 140 that extends from the first end 130 to the second end 132. More particularly, the interior void 140 may be a central bore extending the height D1 of the body 102. The first end 130 may define a closed or fixed bottom (FIGS. 6A and 6B). Alternatively, the first end 130 may define a lower body opening 142 (FIGS. 4 and 5A-5B). The second end 132 defines an upper body opening 118. The interior void 140 and upper body opening 118 may have a diameter D2, and the diameter D2 may be from about 4 inches to about 5 inches. In one example, the diameter D2 is about 4 inches.

The body 102 may further comprise an upper storage portion 104. The upper storage portion 104 may comprise a platform 108, an upper storage portion containment feature 116, and an upper storage portion access opening 117 disposed on the first side 134 of the body 102. The upper storage portion 104 may extend from the platform 108 to the second end 132. In one example, the platform 108 may be rotatably attached to the second side 136 of the body 102 within the interior void 140 and rotate upwardly to a horizontal position in which the platform couples the first side 134 and the second side 136 across the interior void 140. In another example, the platform 108 may be rotatably attached to the second side 136 of the body 102 within the interior void 140 and rotate downwardly to a horizontal position in which the platform couples the first side 134 and the second side 136 across the interior void 140.

The upper storage portion 104 may further comprise an upper storage portion containment feature 116 and an upper storage portion access opening 117. The upper storage portion containment feature 116 may comprise a lower boundary 144 and extending from the lower boundary 144 to the upper opening 118. The upper storage portion access opening 117 is disposed between the platform 108 and the upper storage portion containment feature lower boundary 144. The upper storage portion access opening 117 may have a length D3. In one example, the length D3 may be from about 5 inches to about 6 inches, and in another example, the length D3 may be from about 3 inches to about 5 inches.

Figure 1:
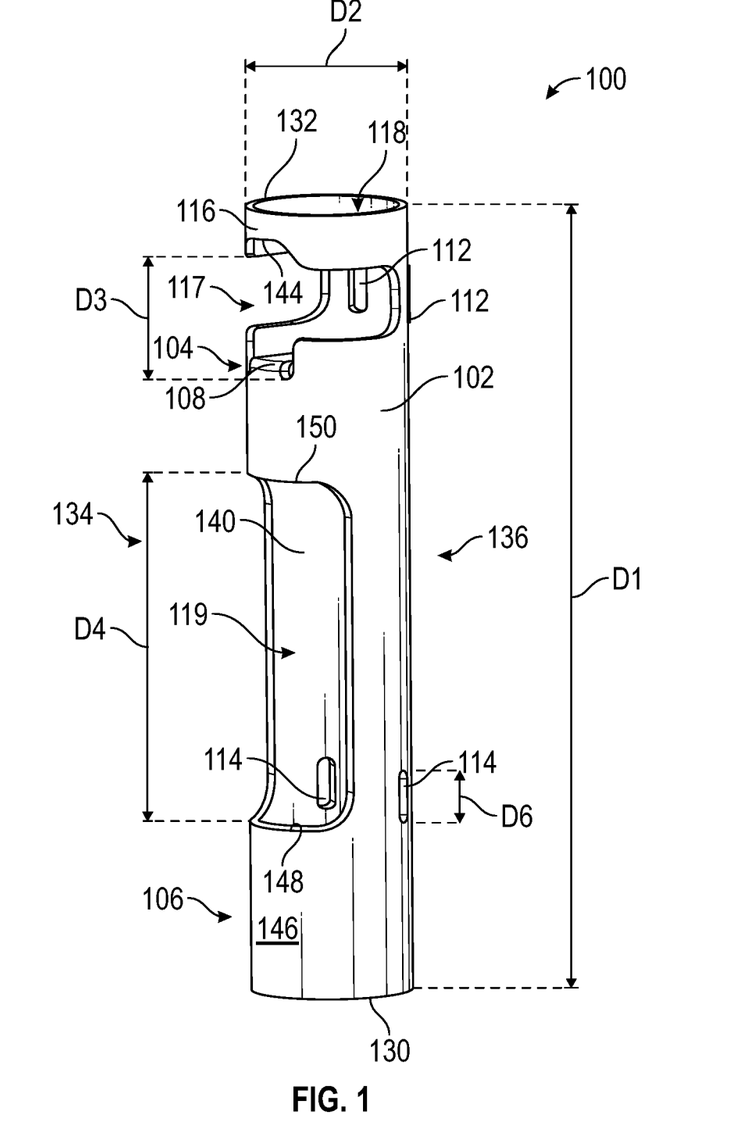
FIG. 1 depicts a schematic perspective view of the sanitization storage apparatus according to one or more embodiments shown and described herein.
Figure 2:
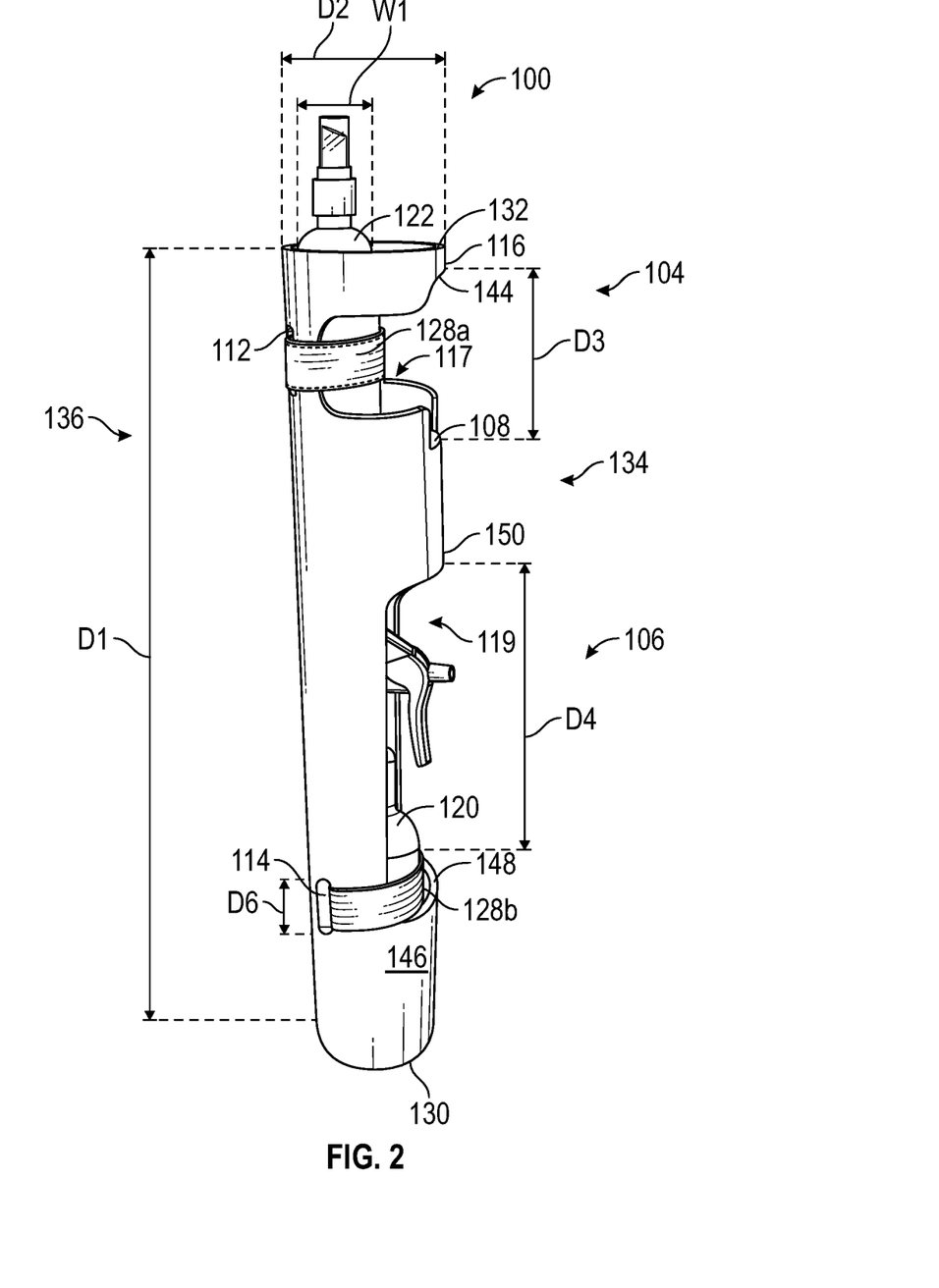
FIG. 2 depicts a schematic side view of the sanitization storage apparatus according to one or more embodiments shown and described herein.
Figure 3:
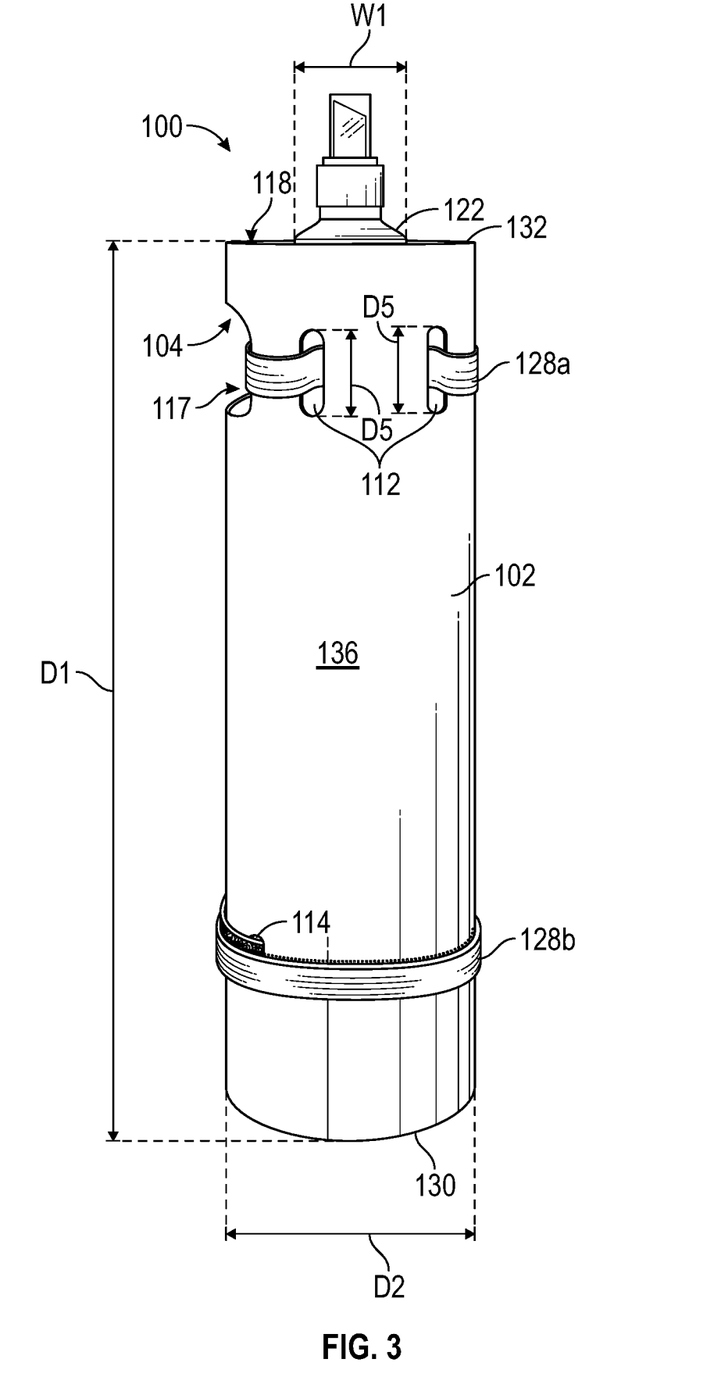
FIG. 3 depicts a schematic rear view of the sanitization storage apparatus according to one or more embodiments shown and described herein.

As best shown in FIGS. 2-4, the upper storage portion 104 is configured to receive a first container 122, such that the first container 122 is disposed upon the platform 108 and extends through the upper opening 118. In this way, the upper storage portion containment feature 116 functions to hold and mitigate the tipping of the first container 122 within the upper storage portion 104.

Moreover, the first container 122, in one example, contains a first sanitation product, and wherein the first sanitation product is a hand sanitizer. Hand sanitizers can be commercially purchased in a variety of container styles and, as such, the first container 122 may take on several different forms. In any form, however, the first container 122 may have a first container maximum width W1, and the first container maximum width W1 is less than the interior void diameter D2.

In one preferred example embodiment, the first container 122 is a pump action dispensing container as shown in FIGS. 2-6B. In this way, the throat of the pump extends upwardly from the main portion of the container, such that the throat of the pump remains above the upper storage portion containment feature 116 along the entire path of travel of the pump. This allows people in communal spaces and passengers boarding a mass transit vehicle 200 to obtain hand sanitizer from the first container 122 easily when passing by the sanitation storage device 100.

It is an important aspect of such an example, that the first container 122 extends over the very top portion of the storage device 100. This extension of the first container 122 above the second end 132 allows for passenger accessibility of the content of the first container, i.e., hand sanitizer, by means of a pump or spray thereby negating the need to remove the entire first container 122 from the upper storage portion 104 for each use.

The body 102 may further comprise a lower storage portion 106. The lower storage portion 106 may extend from the first end 130 to the platform 108. The lower storage portion 106 may further comprise a lower storage portion containment feature 146 and a lower storage portion access opening 119 disposed on the first side 134 of the body 102. The lower storage portion containment feature 146 may have a lower storage containment feature upper boundary 148, which extends from the first end 130 to the lower storage portion containment feature upper boundary 148. The lower storage portion access opening 119 is disposed between lower storage containment feature upper boundary 148 and an access opening upper boundary 150. The access opening upper boundary 150 is disposed between the lower storage containment feature upper boundary 148 and the platform 108. The lower storage portion access opening 119 may have a length D4 that extends from the lower storage containment feature upper boundary 148 to the access opening upper boundary 150. In one example, the length D4 may be from about 9 inches to about 10 inches. In another example, the length D4 may be from about 10 inches to about 12 inches, in order to accommodate taller second container 120 variations.

Accordingly, the lower storage portion 106 is configured to receive a second container 120, such that the second container 120 is disposed within the interior void 140 at the first end 130 and extends above the lower storage portion containment feature upper boundary 148 and into the lower storage access opening 119. In this way, the lower storage portion containment feature 146 functions to hold the second container 120 within the lower storage portion 106.

Moreover, the second container 120, in one example, contains a second sanitation product, and wherein the second sanitation product is a cleaning solution. Cleaning solutions can be commercially purchased in a variety of container styles and, as such, the second container 120 may take on several different forms. In any form, however, the second container 120 may have a second container maximum width W2, and the second container maximum width W2 is less than the interior void diameter D2. However, in one preferred example embodiment, the second container 120 is a spray bottle container as shown in FIGS. 2-6B. In this way, spray portion of the second container 120 remains above the lower storage portion containment feature 146.

As shown best in FIGS. 2-4, the sanitation storage device 100 may further comprise a first securing strap 128*a* configured to secure the first container 122 within the upper storage portion 104 and a second securing strap 128*b* configured to secure the second container 120 within the lower storage portion 106. In further embodiments, the first container 122 and the second container 120 may be coupled to the body 102 by other means such as bungee cords, adhesives, or other physical connectors sufficient to securely connect the bottles or containers to the storage device 100.

The first securing strap 128*a* and the second securing strap 128*b* may comprise a nylon material, a polyester material, or the like. Each of the first securing strap 128*a* and the second securing strap 128*b* may comprise a first end 152, a second end 154, and a first strap fastening feature 155 disposed at the first end 152 and the second end 154. The fastening feature 155 may be a fabric hook and loop fastening feature having a first portion and a second portion. In one example, the first portion is one of a piece of fabric hooks or fabric loops attached at the first end 152 of the respective securing strap 128*a*, 128*b*, and the second portion is the other one of a piece of fabric hooks or fabric loops attached at the second end 154 of the respective securing strap 128*a*, 128*b*.

The body 102 may be designed to cooperatively receive the respective securing straps 128*a*, 128*b*. More particularly, the body 102 may define a plurality of upper storage portion apertures 112 on the second side 136 of the body. The first securing strap 128*a* has a width W3. In one example, the width W3 is about 1 inch. Each of the plurality of upper storage apertures 112 has a first height D5, which is greater than the first width W3. The height D5 may be from about 1 inch to about 2 inches, and in one preferred embodiment, 1.5 inches. In this way, the upper storage portion apertures 112 are configured to receive the first securing strap 128*a*, such that the first securing strap 128*a* secures the first container 122 on the platform 108 adjacent to the second side of the body 136.

The body 102 may further define a plurality of lower storage portion apertures 114 on the second side 136 of the body. The second securing strap 128*b* has a width W4. In one example, the width W4 is about 1 inch. Each of the plurality of lower storage apertures 114 has a height D6, which is greater than the width W4. The height D6 may be from about 1 inch to about 2 inches, and in one preferred embodiment, 1.5 inches. In this way, the lower storage portion apertures 114 are configured to receive the second securing strap 128*b*, such that the second securing strap 128*b* secures the second container 120 within the interior void 140 adjacent to the second side of the body 136.

In an example embodiment, as shown in FIGS. 5A and 5B, wherein the first end 130 defines a lower body opening 142, the sanitation storage device 100 further comprises a mounting component 160, such that the sanitation storage device 100 may be mounted to a fixed substrate 10 in a mass transit vehicle such as a school bus or the like. The mounting component 160 may comprise a base 162, a washer 164, and a securing feature 165. A securing apparatus may include the washer 164 and the securing feature 165. The securing feature 165 may be a self-drilling screw, for example, a 2-inch self-drilling screw. The securing feature 165 couples the washer 164 to the base 162 and further couples the washer 164 and the base 162 to a fixed substrate 10. The base 162 has a bottom 168 and a sidewall 170 extending from the bottom 168. The at least one sidewall 170 is configured to extend into the interior void 140 of the body 102 at the lower body opening 142. The sidewall 170 of the base 162 may be coated with an adhesive compound prior to insertion into the lower body opening 142 to secure the body 102 to the fixed substrate 10. The adhesive compound may include a primer and a PVC or CPVC Cement.

Figure 7:
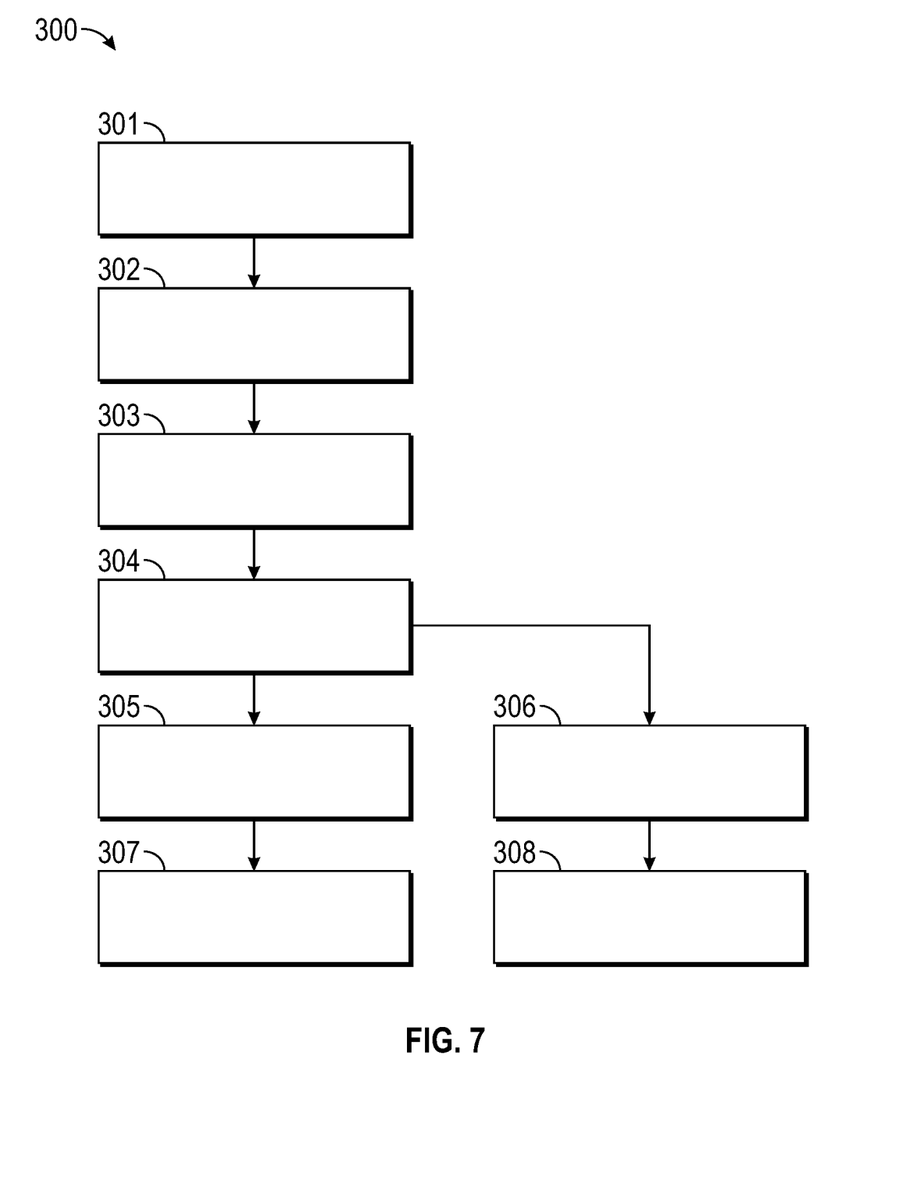
FIG. 7 is a flow chart detailing the present method of installation of the sanitation apparatus of the present invention.

The sanitation storage device 100 of the present invention, as shown in FIGS. 5A and 5B, may be installed on a mass transit vehicle 200, such as a school bus 200, commercial bus, airplane, or the like in accordance with the disclosed method of installation 300 detailed in FIG. 7, via steps 301-308.

At step 301, the body 102 of the sanitation storage device 100 of the present invention is provided. Providing the sanitation storage device 100 of the present invention may further include the forming steps of: obtaining a hollow tubular blank of one of a Polyvinyl Chloride (PVC) or an Acrylonitrile Butadiene Styrene (ABS) material; cutting the tubular blank to a desired length D1; programming a Computer Numerical Control (CNC) cutting machine to customize the tubular blank; inserting the tubular blank into the CNC machine; and forming each of the lower portion access opening, the upper storage portion access opening, the plurality of upper storage portion apertures, and the plurality of lower storage portion apertures in the first side of the tubular blank with the CNC machine.

At step 302, the base 162 is secured to the floor 10 of the mass transit vehicle 200 such as a school bus 200 or the like, with the washer 164 and the securing feature 165, wherein the securing feature 165 is positioned at the center of the washer 164 and the base 162 and screwed into the fixed substrate 10, e.g., the floor of the school bus 200.

At step 303, an adhesive compound is applied to the sidewall 170 of the base 162. At step 304, the lower body opening 142 is positioned about the side wall 170 of the base 162, such that the sidewall 170 extends upward from the first end 130 of the body 102 and into the interior void 140. When the body 102 is positioned upon and about the base 162, the body 102 is positioned, such that the first side 134 faces a driver's seat of the mass transit vehicle 200 and the second side 136 faces an entrance of the mass transit vehicle 200, as shown in FIGS. 5A and 5B.

At step 305, the first container 122, filled with a hand sanitizer, is positioned in the upper storage portion 104, such that the first container 122 rests on the platform 108 and extends through the upper body opening 118 and above the second end 132.

At step 306, the second container 120, filled with a cleaning solution, is positioned in the lower storage portion 106, such that the second container 120 is disposed upon the base 162 within the interior void 140 and extends above the lower containment feature upper boundary 150 and into the lower storage access opening 119.

At step 307, the first container 122 is secured within the upper storage portion 104 with a first securing strap 128*a*. In this way, the first securing strap 128*a* is positioned about the first container 122 and the upper storage portion 104 at the upper storage portion access opening 117 and the first securing strap 128*a* is further disposed within a plurality of upper storage portion apertures 112 disposed on the second side 136 of the body 102. Securing the first container 122 within the upper storage portion 104 with the first securing strap 128*a* may further include cinching the first securing strap 128*a* about the first container 122 within the upper storage portion 104 and fastening the first securing strap 128*a* with the fastening feature 155.

At step 308, the second container 120 is secured within the lower storage portion 106 with a second securing strap 128*b*. In this way, the second securing strap 128*b* is positioned about the second container 120 and the lower storage portion 106 at the lower storage portion access opening 119 and the second securing strap 128*b* is further disposed within a plurality of lower storage portion apertures 114 disposed on the second side 136 of the body 102. Securing the second container 120 within the lower storage portion 106 with the second securing strap 128*b* may further include cinching the second securing strap 128*b* about the second container 120 within the lower storage portion 106 and fastening the second securing strap 128*b* with the fastening feature 155.

The apparatus 100 of the present disclosure comprises a mountable holder and storage device for holding and safely securing both hand sanitizer and cleaning supplies. The storage device 100 and the method of installation 300 disclosed herein allows for storage of two essential disease mitigation materials, e.g., hand sanitizer and cleaning solution in a manner that conceals the cleaning solution, as required by various laws and regulations particularly in communal spaces that house groups of children, while allowing easy access to the hand sanitizer in the respective communal space. However, while out of the passenger line of sight, when the cleaning solution is needed to clean the bus, or other vehicle, the cleaning solution is readily available and accessible to the driver of the vehicle.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. A storage device configured to be coupled to a fixed substrate, the storage device comprising:
 a body extending from a first end to a second end and having a first side and a second side, the body defining an interior void extending between the first end and the second end, wherein the second end defines an upper body opening and the first end defines a lower body opening, the body further comprising:
  an upper storage portion comprising:
   a platform, wherein the upper storage portion extends from the platform to the second end; and
   an upper storage portion access opening disposed between the platform and the second end;
  a lower storage portion extending from the first end to the platform, the lower storage portion comprising:
   a lower storage portion containment feature having a lower storage containment feature upper boundary and extending from the first end to the lower storage portion containment feature upper boundary;
   a lower storage portion access opening disposed between the lower storage portion containment feature upper boundary and an access opening upper boundary, wherein the access opening upper boundary is disposed between the lower storage containment feature upper boundary and the platform;
  a mounting component having a base comprising a bottom and at least one sidewall extending from the bottom, wherein the least one sidewall is configured to extend into the interior void of the body at the lower body opening;
  wherein the upper storage portion is configured to receive a first container, such that the first container is disposed upon the platform and extends through the upper opening; and
  wherein the lower storage portion is configured to receive a second container, such that the second container is disposed within the interior void at the first end and extends above the lower storage portion containment feature upper boundary and into the lower storage access opening.

2. The storage device of claim 1 further comprising a first securing strap configured to secure the first container within the upper storage portion.

3. The storage device of claim 2 wherein:
 the first container contains a first sanitation product, and wherein the first sanitation product is a hand sanitizer; and
 the second container contains a second sanitation product, and wherein the second sanitation product is a cleaning solution.

4. The storage device of claim 2 further comprising a second securing strap configured to secure the second container within the lower storage portion.

5. The storage device of claim 4 wherein the upper storage portion further comprises:
 an upper storage portion containment feature having an upper storage portion lower boundary and extending from the upper storage portion lower boundary to the upper opening; and
 wherein the upper storage portion access opening is disposed between the platform and the upper storage portion containment feature lower boundary.

6. The storage device of claim 5 wherein the interior void has an interior void diameter.

7. The storage device of claim 6 wherein the interior void diameter is about 4 inches.

8. The storage device of claim 4 wherein the body further defines:
- a plurality of upper storage portion apertures on the second side of the body, wherein upper storage portion apertures are disposed closer to the second end of the body than the first end of the body, and wherein the upper storage portion apertures are configured to receive the first securing strap, such that the first securing strap secures the first container on the platform adjacent to the second side of the body; and
- a plurality of lower storage portion apertures on the second side of the body, wherein lower storage portion apertures are disposed closer to the first end of the body than the second end of the body, and wherein the lower storage portion apertures are configured to receive the second securing strap, such that the second securing strap secures the second container within the interior void adjacent to the second side of the body.

9. The storage device of claim 8 wherein:
- each of the plurality of upper storage apertures has a first height and the first securing strap has a first width, and wherein the first height is greater than the first width; and
- each of the plurality of lower storage apertures has a second height and the second securing strap has a second width, and wherein the second height is greater than the second width.

10. The storage device of claim 9 wherein:
- the first width is about 1 inch and the first height is about 1.5 inches; and
- the second width is about 1 inch and the second height is about 1.5 inches.

11. The storage device of claim 9 wherein:
- the first securing strap has a first end, a second end, and a first strap fastening feature disposed at the first end and the second end; and
- the first strap fastening feature is a fabric hook and loop fastening feature having a first portion and a second portion, such that:
  - the first portion is one of a piece of fabric hooks or fabric loops attached at the first end of the first securing strap; and
  - the second portion is the other one of the piece of fabric hooks or fabric loops attached at the second end of the first securing strap.

12. The storage device of claim 11 wherein:
- the second securing strap has a first end, a second end, and a second strap fastening feature disposed at the first end and the second end; and
- the second strap fastening feature is a fabric hook and loop fastening feature having a first portion and a second portion, such that:
  - the first portion is one of a piece of fabric hooks or fabric loops attached at the first end of the second securing strap; and
  - the second portion is the other one of the piece of fabric hooks or fabric loops attached at the second end of the second securing strap.

13. The storage device of claim 9 wherein the mounting component further comprises:
- a securing apparatus including a washer and a securing feature, wherein the securing feature is configured to couple the washer and the base to the fixed substrate.

14. The storage device of claim 13 wherein the sidewall of the base is fixedly coupled to the body with an adhesive compound.

15. A method of installing a storage device for sanitizing implements on a mass transit vehicle, the method comprising:
- providing a storage device, the storage device comprising:
  - a body extending from a first end to a second end and having a first side and a second side, the body defining an interior void extending between the first end and the second end, wherein the second end defines an upper body opening, the body further comprising:
  - an upper storage portion comprising:
    - a platform, wherein the upper storage portion extends from the platform to the second end;
    - an upper storage portion access opening disposed between the platform and the second end;
  - a lower storage portion extending from the first end to the platform, the lower storage portion comprising:
    - a lower storage portion containment feature having a lower storage containment feature upper boundary and extending from the first end to the lower storage portion containment feature upper boundary;
    - a lower storage portion access opening disposed between the lower storage portion containment feature upper boundary and an access opening upper boundary, wherein the access opening upper boundary is disposed between the lower storage containment feature upper boundary and the platform; and
  - a mounting feature including:
    - a base having a bottom and at least one sidewall extending from the bottom; and
    - a securing apparatus including a washer and a securing feature;
- securing the base to a floor of the mass transit vehicle with the securing apparatus;
- coupling the first end of the body to the at least one sidewall of the base; and
- positioning the lower body opening about the at least one sidewall of the base, such that the at least one sidewall extends upwardly from the first end of the body and into the interior void, and positioning the body such that the first side faces a driver's seat of the mass transit vehicle and the second side faces an entrance of the mass transit vehicle.

16. The method of claim 15 wherein coupling the first end of the body to the at least one sidewall of the base further includes applying an adhesive compound to the at least one sidewall of the base.

17. The method of claim 15 further comprising:
- positioning a first container in the upper storage portion such that the first container rests on the platform and extends through the upper opening, wherein the first container is filled with a hand sanitizer; and
- positioning a second container in the lower storage portion, such that the second container is disposed upon the base within the interior void and extends above the lower containment feature upper boundary and into the lower storage access opening, wherein the second container is filled with a cleaning solution.

18. The method of claim 17 further comprising:
- securing the first container within the upper storage portion with a first securing strap, wherein the first securing strap is positioned about the first container and the upper storage portion at the upper storage portion access opening and the first securing strap is further disposed within a plurality of upper storage portion apertures disposed on the second side of the body; and securing the second container within the upper storage portion with a second securing strap, wherein the second securing strap is positioned about the second container and the lower storage portion at the lower storage portion access opening and the second securing strap is further disposed within a plurality of lower storage portion apertures disposed on the second side of the body.

19. The method of claim 18 wherein:
each of the plurality of upper storage portion apertures has a first height and the first securing strap has a first width, and wherein the first height is larger than the first width; and
each of the plurality of lower storage portion apertures has a second height and the second securing strap has a second width, and wherein the second height is larger than the second width.

20. The method of claim 19 wherein providing the storage device further comprises:
obtaining a hollow tubular blank of one of a Polyvinyl Chloride (PVC) or an Acrylonitrile Butadiene Styrene (ABS) material;
cutting the hollow tubular blank to a desired height;
programming a Computer Numerical Control (CNC) cutting machine to customize the hollow tubular blank;
inserting the hollow tubular blank into the CNC machine; and
forming each of the lower portion access opening, the upper storage portion access opening in the first side of the hollow tubular blank with the CNC machine and forming each of the plurality of upper storage portion apertures and the plurality of lower storage portion apertures in the second side of the hollow tubular blank.

* * * * *